United States Patent
Nagarajan

(10) Patent No.: US 7,630,519 B2
(45) Date of Patent: Dec. 8, 2009

(54) SYSTEMS AND METHODS FOR PRINTING ON PRE-PRINTED FORMS

(75) Inventor: Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 744 days.

(21) Appl. No.: 11/239,262

(22) Filed: Sep. 29, 2005

(65) Prior Publication Data

US 2007/0076278 A1    Apr. 5, 2007

(51) Int. Cl.
*G06K 9/00* (2006.01)
(52) U.S. Cl. .................. 382/112; 382/103; 715/200; 358/1.18
(58) Field of Classification Search .................. 382/232, 382/103, 112; 715/200; 235/456; 358/1.18
See application file for complete search history.

(56) References Cited

U.S. PATENT DOCUMENTS

| | | | |
|---|---|---|---|
| 4,809,220 A * | 2/1989 | Carlson et al. | 358/1.18 |
| 5,140,650 A * | 8/1992 | Casey et al. | 382/283 |
| 5,229,589 A * | 7/1993 | Schneider | 235/456 |
| 5,317,646 A | 5/1994 | Sang, Jr. et al. | |
| 5,721,940 A * | 2/1998 | Luther et al. | 715/200 |
| 5,742,879 A | 4/1998 | Altrieth, III | |
| 6,032,004 A | 2/2000 | Mirabella, Jr. et al. | |
| 6,909,526 B1 | 6/2005 | Dawe | |
| 2005/0190981 A1 | 9/2005 | Fan et al. | |

* cited by examiner

*Primary Examiner*—Tom Y Lu
(74) *Attorney, Agent, or Firm*—Gibb I.P. Law Firm, LLC

(57) ABSTRACT

Embodiments herein provide methods and systems for copying and printing completed template documents. For example, one method provides information regarding a document template sheet. The document template sheet comprises a media sheet having template markings thereon. The method scans a completed document to produce a scanned image. The completed document comprises a second media sheet having the template markings and additional markings. The method processes the scanned image to separate data relating to the additional markings from data relating to the template markings. Then the method can print/copy only the additional markings on blanks of the document template sheets. This avoids reprinting/recopying the template upon itself and saves resources because only the additional markings need to be processed through the temporary storage and printing engine.

20 Claims, 3 Drawing Sheets

SYSTEMS AND METHODS FOR PRINTING ON PRE-PRINTED FORMS

BACKGROUND

In an office environment it is common to encounter documents with the same or similar backgrounds, such as presentation slides, logos, banners, letterhead, etc. In some instances template documents are completed by many different individuals. When it is necessary to photocopy such templates, a large portion of the document being copied is redundant in that all of the template information is repetitive. It is wasteful and inefficient to continually process this repetitive information.

SUMMARY

Embodiments herein provide methods and systems for copying and printing completed template documents. For example, one method provides information regarding a document template sheet. The document template sheet comprises a media sheet having template markings thereon. The method scans a completed document to produce a scanned image. The completed document comprises a second media sheet having the template markings and additional markings. The method processes the scanned image to separate data relating to the additional markings from data relating to the template markings. Then the method can print/copy only the additional markings on blanks of the document template sheets. This avoids reprinting/recopying the template upon itself and saves resources because only the additional markings need to be processed through the temporary storage and printing engine.

The information regarding the document template sheet can be obtained by scanning the document template sheet or by accessing a database containing the information regarding the document template sheet. In one embodiment, the additional markings are temporarily stored before the printing is performed. With embodiments herein, the additional markings can be printed/copied on a second document template sheet different than the document template sheet. This allows information from older templates to be printed copied onto the most up-to-date template forms.

In order to perform the above processing, various apparatus embodiments are presented herein. In one apparatus embodiment, a storage unit is operatively connected to a central processing unit, and the storage unit is adapted to maintain the information regarding the document template sheet. A scanner is also operatively connected to the central processing unit. The scanner is adapted to scan documents such as the completed document. Also, a printing engine is operatively connected to the central processing unit. The central processing unit is adapted to process the scanned image to separate data relating to the additional markings from data relating to the template markings. In addition, when the completed document is scanned using the scanner, the central processing unit is adapted to direct the printing engine to print only the additional markings on the document template sheet.

The central processing unit is adapted to store the information regarding the document template sheet in the storage unit after the document template sheet is scanned using the scanner. Alternatively, the storage unit comprises a database storing information regarding a plurality of document template sheets. Also, the central processing unit is further adapted to direct the printing engine to print the additional markings on the second document template sheets that are different than the original document template sheet. The storage unit is further adapted to temporarily store the additional markings before the printing engine prints the additional markings on the document template sheet. The printer comprises an electrostatographic and/or a xerographic machine and process.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
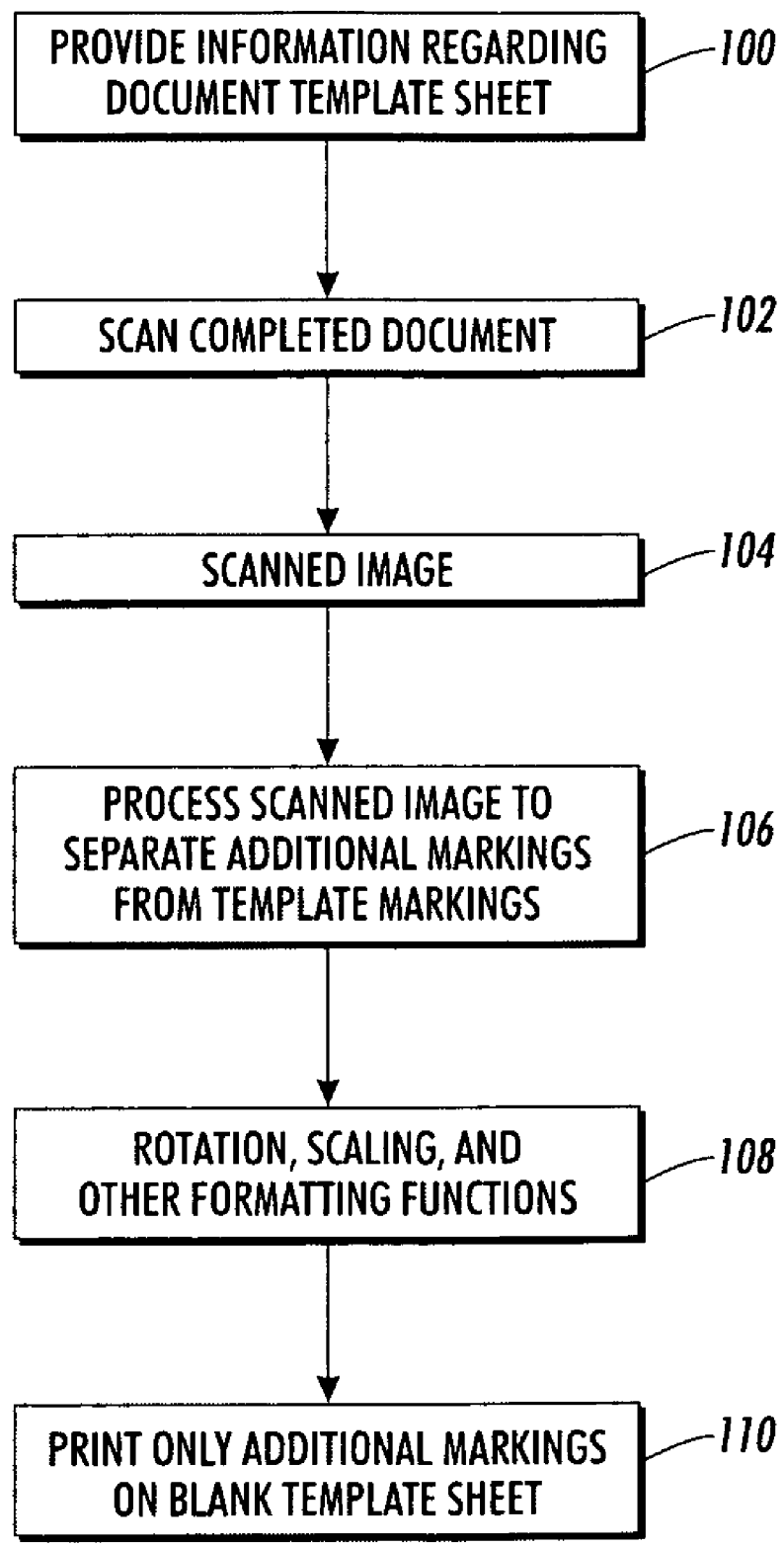
FIG. 1 is a flow diagram illustrating aspects of embodiments herein.

Embodiments herein provide methods and systems for copying and printing completed template documents. Referring to the flowchart in FIG. 1, one method embodiment herein provides information regarding a document template sheet 100. The document template sheet comprises a first media sheet having template markings thereon. For example, template markings can include banners, logos, letterhead, questions with corresponding spaces for answers, data headings with spaces for data, etc.

The method scans a completed document 102 to produce a scanned image 104. The completed document comprises a second media sheet having the template markings of the first media sheet and additional markings added to the template when the user filled in the template. The method processes the scanned image to separate data relating to the additional markings from data relating to the template markings 106.

In addition, rotation, scaling, and other formatting functions can be applied to the additional markings to ensure that the additional markings are properly aligned with and sized for the blank spaces (openings) within the template in item 108. Thus, for example, the additional markings can be virtually positioned within a print preview of the template and automatic comparisons can be made to determine if the additional markings are out of alignment or improperly sized for the space available in the template. If improper alignment or sizing occurs, the embodiments herein can automatically make corrections to the rotation, scaling, formatting etc. For example, the magnitude of the measure of incorrect rotation, sizing, font type, etc. found when comparing the additional markings to the template can be applied with a reverse sign (opposite sign (positive to negative; negative to positive)) to the additional markings to make the additional markings consistent with the space available in the template in item 108. Then, the method can print/copy only the additional markings on blanks of the document template sheets 110. In one embodiment, the additional markings are temporarily stored before the printing is performed. This avoids reprinting/recopying the template upon itself and saves resources because only the data relating to the additional markings needs to be processed through the temporary storage and printing engine.

The embodiments herein can separate the additional markings from the template markings in a number of different ways in item 106. In one example, a pixel-by-pixel comparison can be performed which essentially subtracts all dark (or colored) pixels relating to the template markings from the bitmap of the scanned completed document to leave only dark (or colored) pixels of the additional markings. Alternatively, the embodiments herein can block off specific areas which contained template markings and ignore any bitmap information from these blocked-off areas.

In other words, geometric shapes are automatically created to surround all of the template markings. The locations, sizes, and/or shapes, etc. of these geometric shapes are recorded and data regarding markings within the areas of these geometric shapes are subtracted from the bitmap of scanned data to leave only bitmap data relating to the additional markings. One ordinarily skilled in the art would understand that there are many different methodologies that can be utilized with embodiments herein to segregate the additional markings from the template markings when analyzing the scanned image of the completed document, and that the foregoing are only some of the examples contemplated for use with embodiments herein.

The information regarding the document template sheet can be obtained by scanning the document template sheet or by accessing a database containing the information regarding the document template sheet. With embodiments herein, if the templates are retrieved from a database, the additional markings can be printed/copied on a second document template sheet different than the document template sheet. This allows information from older templates to be printed/copied onto the most up-to-date template forms. Thus, if the letterhead or logo changes, a previously printed document can be copied with the new or revised letterhead or logo. In other words, so long as a new or revised template occupies the same area on the page as the old template occupied, the new template can be printed in place of the old template on the completed document that was scanned. This allows previously acquired data to be added to updated template forms without having to re-enter the data, so long as the areas occupied by the old template markings match the areas occupied by the new template markings.

Figure 2:
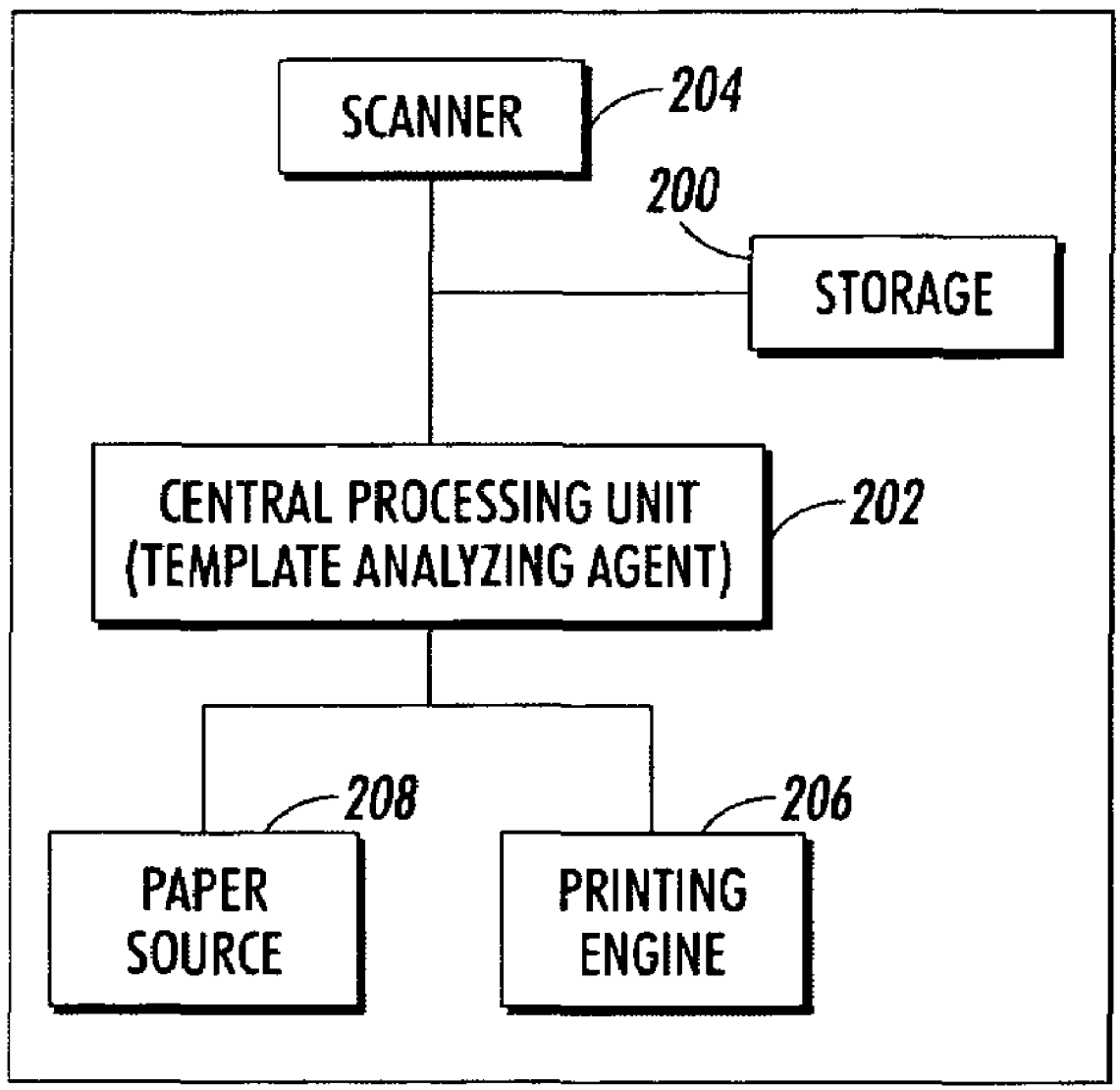
FIG. 2 is a schematic representation of a printing/copying device according to embodiments herein.

In order to perform the above processing, various apparatus embodiments are presented herein. In one apparatus embodiment illustrated in FIG. 2, a storage unit 200 (such as a database or temporary storage) is operatively connected to a central processing unit (template analyzing agent) 202, and the storage unit 200 is adapted to maintain the information regarding the document template sheet. A scanner 204 is also operatively connected to the central processing unit 202. The scanner 204 is adapted to scan documents such as the completed document. Also, a printing engine 206 and paper source 208 are operatively connected to the central processing unit 202.

The central processing unit 202 is adapted to process the scanned image to separate data relating to the additional markings from data relating to the template markings (obtained from the database 200 or scanned template image stored in temporary memory 200) with knowledge of which paper is contained within the paper source 208. In addition, when the completed document is scanned using the scanner 204, the central processing unit 202 is adapted to direct the printing engine 206 to print only the additional markings on the document template sheet.

The central processing unit 202 is adapted to store the information regarding the document template sheet in the storage unit 200 after the document template sheet is scanned using the scanner 204. Alternatively, the storage unit 200 comprises a local or remote database storing information regarding a plurality of document template sheets. Also, the central processing unit 202 is further adapted to direct the printing engine 206 to print only the additional markings on the second document template sheets that are different than the original document template sheet. The storage unit 200 is further adapted to temporarily store the additional markings before the printing engine 206 prints the additional markings on the document template sheet. The printer comprises at least one of an electrostatographic and a xerographic machine and process.

Figure 3:
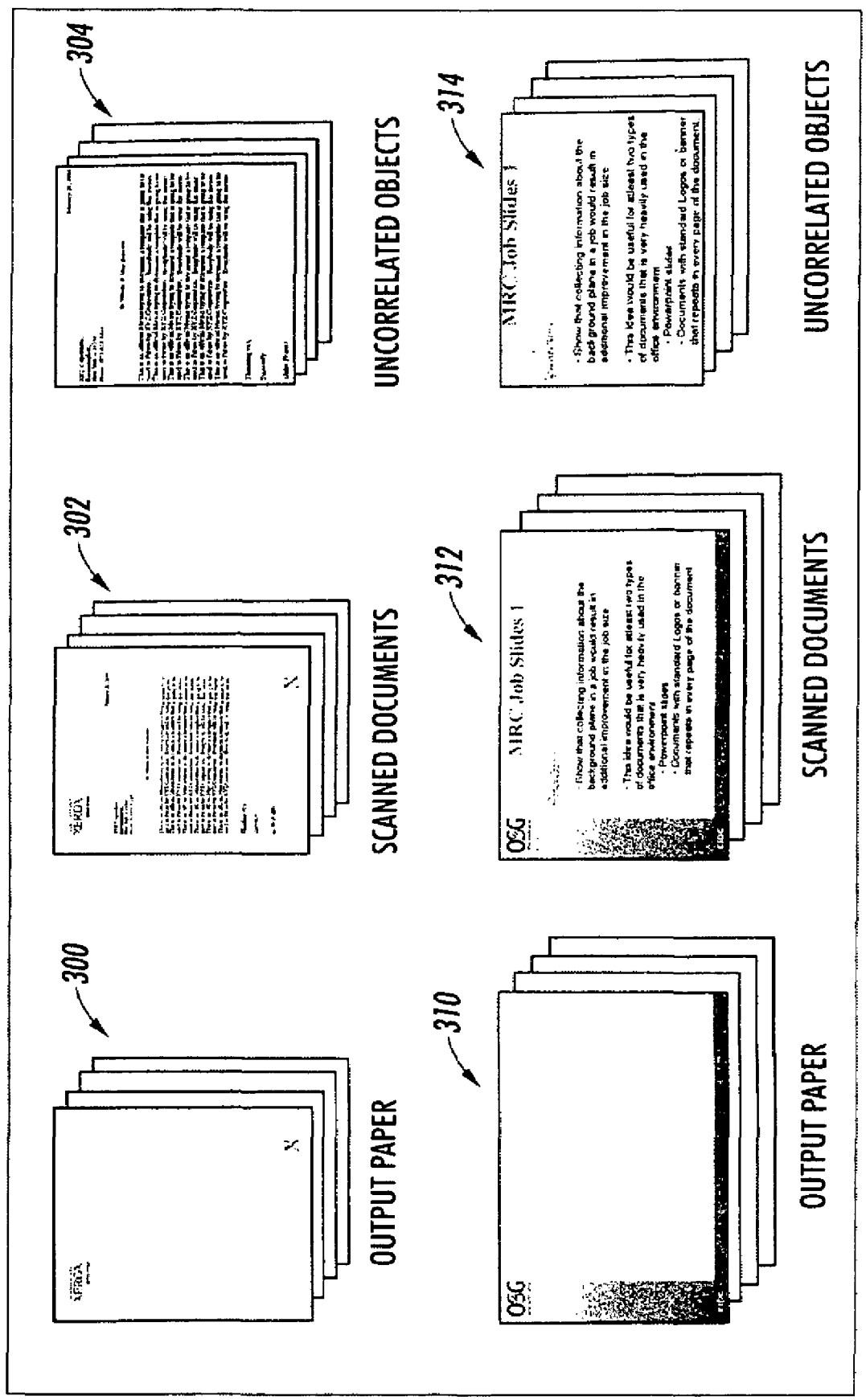
FIG. 3 illustrate various template documents, scanned completed documents, and the additional data obtained from the scanned completed documents.

FIG. 3 shows two examples of template markings (300, 310), completed documents (302, 312), and additional markings separated from the template markings (304, 314). More specifically, items 300 and 310 comprise the blank templates printed on output paper that would be stored in the paper source 208. The central processing unit 202 would be notified by the user through a graphic user interface or other similar input of the specific template being loaded into the paper source 208 at the time the paper is loaded into the paper source 208. Alternatively, a sheet of output paper 300, 310 could be scanned by the scanner 204 as it is loaded into the paper source 208 to allow the template markings to be stored in the storage unit 200. Items 302 and 312 represent previously printed completed documents that contained both the template markings and the additional markings. The completed documents 302, 312 are scanned using the scanner 204. Then, the central processing unit 202 removes the template markings from the scanned completed documents to filter out the additional markings which are shown as on correlated objects stored in the storage unit 304, 314.

As shown above, the embodiments herein provide a predictive methodology that fully utilizes correlations between and documents and output paper. With the embodiments herein, only the image regions that are outside the document template (e.g., the "additional markings") will be coded and stored in memory. The common regions of the template are not processed, thereby reducing the demand on processing resources. Therefore, regions such as logos, letterheads, banners, etc. are not stored in a scanned bitmapped image.

For example, with embodiments herein, when a user loads template documents into the paper tray of a multi-function device, such as a copier or printer, a setup procedure is performed where a sample paper with the (blank, not completed) template markings alone thereon is scanned using the scanner of the multi-function device. The central processing unit then identifies the template markings and stores the template markings in memory. Examples of such objects could include colored text, halftone images, photograph images, etc. Information relating to the objects and their spatial coordinates on the sheet are stored in memory. Alternatively, rather than scanning an example of the template, the user could select the template from an associated database that was previously created. Then, when the completed template documents are scanned by the scanner, a comparison is made between the information regarding the template alone and the completed document. The template information is subtracted from the completed document, thereby leaving only the additional data. During this process, course and fine matching steps, such as those described in U.S. Pub. No. 2005/0190981, the complete disclosure of which is incorporated herein by reference, can be utilized to correlate to the scanned completed document and the scanned template document. As described above, only the additional data is marked on (printed onto) the blank template form.

The embodiments herein allow and the user substantial flexibility. For example, pre-printed forms with more expensive color logo templates can be utilized in less expensive black-and-white printers to produce a high-quality documents that are based upon the color logo template. Further, the embodiments herein promote consistent utilization of the most current logo or letterhead template (even when copying from documents that contain a less current logo or letterhead) because embodiments herein will remove in the previous template information when printing the additional data on the most current template. Further, with embodiments herein, the rotation, scaling, and other formatting functions can be adjusted to ensure that the additional data is properly aligned and positioned on the template when the additional data is printed on the template document.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The following claims can encompass embodiments that print in monochrome, color, or handle color image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A machine-implemented method comprising:
providing information regarding a document template sheet, wherein said document template sheet comprises a first media sheet having a first set of template markings thereon said first set of template markings defining a first set of spaces for data;
scanning a completed document, using a scanner, wherein said completed document comprises a second media sheet having said template markings and additional markings said additional markings being located in said first set of spaces for data; and
printing, using a printer, only said additional markings from said document template sheet onto a third media sheet having a second set of template markings thereon, wherein said second set of template markings are different from said first set of template markings and said second set of template markings defining a second set of spaces for data, different than said first set of spaces for data, into which said additional markings are located.

2. The method according to claim 1, wherein said providing of said information regarding said document template sheet comprises scanning said document template sheet.

3. The method according to claim 1, wherein said providing of said information regarding said document template sheet comprises accessing a database storing said information regarding said document template sheet.

4. The method according to claim 1, further comprising storing said additional markings before performing said printing.

5. The method according to claim 1, further comprising printing said additional markings on a second document template sheet different than said document template sheet.

6. A method comprising:
providing information regarding a document template sheet, wherein said document template sheet comprises a first media sheet having a first set of template markings thereon said first set of template markings defining a first set of spaces for data;
scanning a completed document, using a scanner, to produce a scanned image, wherein said completed document comprises a second media sheet having said template markings and additional markings said additional markings being located in said first set of spaces for data;
processing said scanned image to separate data relating to said additional markings from data relating to said template markings; and
printing, using a printer, only said additional markings from said document template sheet onto a third media sheet having a second set of template markings thereon, wherein said second set of template markings are different from said first set of template markings and said second set of template markings defining a second set of spaces for data, different than said first set of spaces for data, into which said additional markings are located.

7. The method according to claim 6, wherein said providing of said information regarding said document template sheet comprises scanning said document template sheet.

8. The method according to claim 6, wherein said providing of said information regarding said document template sheet comprises accessing a database storing said information regarding said document template sheet.

9. The method according to claim 6, further comprising storing said additional markings before performing said printing.

10. The method according to claim 6, further comprising printing said additional markings on a second document template sheet different than said document template sheet.

11. An apparatus comprising:
a central processing unit;
a storage unit operatively connected to said central processing unit, wherein said storage unit is adapted to maintain information regarding a document template sheet, and wherein said document template sheet comprises a first media sheet having a first set of template markings thereon said first set of template markings defining a first set of spaces for data;
a scanner operatively connected to said central processing unit, wherein said scanner is adapted to scan a completed document, wherein said completed document comprises a second media sheet having said template markings and additional markings said additional markings being located in said first set of spaces for data; and
a printing engine operatively connected to said central processing unit,
wherein, when said completed document is scanned using said scanner, said central processing unit is adapted to direct said printing engine to print only said additional markings from said document template sheet onto a third media sheet having a second set of template markings thereon, wherein said second set of template markings are different from said first set of template markings and said second set of template markings defining a second set of spaces for data, different than said first set of spaces for data, into which said additional markings are located.

12. The apparatus according to claim 11, wherein said central processing unit is adapted to store said information regarding said document template sheet in said storage unit after said document template sheet is scanned using said scanner.

13. The apparatus according to claim 11, wherein said storage unit comprises a database storing information regarding a plurality of document template sheets.

14. The apparatus according to claim 11, wherein said storage unit is further adapted to store said additional markings before said printing engine prints said additional markings on said document template sheet.

15. The apparatus according to claim 11, wherein said central processing unit is further adapted to direct said printing engine to print said additional markings on a second document template sheet different than said document template sheet.

16. An apparatus comprising:
a central processing unit;
a storage unit operatively connected to said central processing unit, wherein said storage unit is adapted to maintain information regarding a document template sheet, and wherein said document template sheet comprises a first media sheet having a first set of template markings thereon said first set of template markings defining a first set of spaces for data;
a scanner operatively connected to said central processing unit, wherein said scanner is adapted to scan a completed document, wherein said completed document comprises a second media sheet having said template markings and additional markings said additional markings being located in said first set of spaces for data; and
a printing engine operatively connected to said central processing unit,
wherein said central processing unit is adapted to process said scanned image to separate data relating to said additional markings from data relating to said template markings, and
wherein, when said completed document is scanned using said scanner, said central processing unit is adapted to direct said printing engine to print only said additional markings from said document template sheet onto a third media sheet having a second set of template markings thereon, wherein said second set of template markings are different from said first set of template markings and said second set of template markings defining a second set of spaces for data, different than said first set of spaces for data, into which said additional markings are located.

17. The apparatus according to claim 16, wherein said central processing unit is adapted to store said information regarding said document template sheet in said storage unit after said document template sheet is scanned using said scanner.

18. The apparatus according to claim 16, wherein said storage unit comprises a database storing information regarding a plurality of document template sheets.

19. The apparatus according to claim 16, wherein said storage unit is further adapted to store said additional markings before said printing engine prints said additional markings on said document template sheet.

20. The apparatus according to claim 16, wherein said printing engine comprises at least one of an electrostatographic and a xerographic machine and process.

* * * * *